United States Patent [19]

Leitner

[11] Patent Number: 5,678,837
[45] Date of Patent: *Oct. 21, 1997

[54] REAR SUSPENSION FOR BICYCLES

[76] Inventor: Horst Leitner, 429 Aster St., Laguna Beach, Calif. 92651

[*] Notice: The term of this patent shall not extend beyond the expiration date of Pat. No. 5,509,679.

[21] Appl. No.: 633,201

[22] Filed: Apr. 16, 1996

Related U.S. Application Data

[63] Continuation of Ser. No. 303,568, Sep. 9, 1994, Pat. No. 5,509,679, which is a continuation of Ser. No. 6,325, Jan. 21, 1993, abandoned, which is a continuation-in-part of Ser. No. 827,089, Jan. 21, 1992, abandoned.

[51] Int. Cl.$^6$ .................................................. B62K 25/20
[52] U.S. Cl. .................................... 280/284; 280/261
[58] Field of Search ................................ 280/283, 284, 280/285, 286, 288, 275, 710, 716, 259, 260, 261

[56] References Cited

U.S. PATENT DOCUMENTS

| | | | |
|---|---|---|---|
| 414,121 | 11/1889 | Williams | 280/284 |
| 439,095 | 10/1890 | Becker . | |
| 467,794 | 1/1892 | Ellis | 280/284 |
| 494,803 | 4/1893 | Cable | 280/284 |
| 564,319 | 7/1896 | Travis | 280/284 |
| 578,615 | 3/1897 | Travis | 280/284 |
| 603,418 | 5/1898 | Adriance | 280/284 |
| 644,788 | 3/1900 | Williams | 280/284 |
| 657,667 | 9/1900 | Mills | 280/284 |
| 667,594 | 2/1901 | Soucy, Jr. | 280/284 |
| 708,202 | 9/1902 | Case | 280/284 |
| 712,784 | 11/1902 | Ellis . | |
| 1,047,430 | 12/1912 | Michaelson . | |
| 1,283,030 | 10/1918 | Ashton . | |
| 1,298,958 | 4/1919 | Johnston . | |
| 2,863,672 | 12/1958 | Murata | 280/283 |
| 3,819,002 | 6/1974 | Heathwaite et al. . | |
| 3,931,990 | 1/1976 | Knapp | 280/283 |
| 4,039,200 | 8/1977 | McGonegle | 280/284 |
| 4,058,181 | 11/1977 | Buell | 180/32 |
| 4,299,582 | 11/1981 | Leitner | 474/109 |
| 4,322,088 | 3/1982 | Miyakoshi et al. | 280/284 |
| 4,421,337 | 12/1983 | Pratt | 280/277 |
| 4,440,413 | 4/1984 | Miyakoshi et al. | 280/284 |
| 4,529,056 | 7/1985 | Kreuz | 180/227 |
| 4,579,189 | 4/1986 | Tanaka | 180/227 |
| 4,582,343 | 4/1986 | Waugh | 280/284 |
| 4,679,811 | 7/1987 | Shuler | 280/284 |
| 4,789,174 | 12/1988 | Lawwill | 280/284 |
| 5,000,470 | 3/1991 | Kamler et al. | 280/275 |
| 5,121,937 | 6/1992 | Lawwill | 280/284 |
| 5,129,665 | 7/1992 | Sutter et al. | 280/274 |
| 5,217,241 | 6/1993 | Girvin | 280/284 |
| 5,226,674 | 7/1993 | Buell | 280/284 |
| 5,332,246 | 7/1994 | Buell | 280/288 |
| 5,337,861 | 8/1994 | Romano | 280/261 |
| 5,370,411 | 12/1994 | Takamiya et al. | 280/284 |
| 5,409,249 | 4/1995 | Busby | 280/284 |
| 5,441,292 | 8/1995 | Busby | 280/284 |
| 5,509,679 | 4/1996 | Leitner | 280/284 |

FOREIGN PATENT DOCUMENTS

| | | |
|---|---|---|
| 221626 | 9/1957 | Australia . |
| 383892 | 5/1954 | Belgium . |
| 986467 | 8/1951 | France . |

OTHER PUBLICATIONS

S–Works Bicycles, 1993 Catalog, pp. 1–15.

*Primary Examiner*—Anne Marie Boehler
*Attorney, Agent, or Firm*—Knobbe, Martens Olson & Bear, LLP.

[57] ABSTRACT

A rear wheel suspension for a bicycle includes paired lower arm members pivotally connected to the bicycle frame seat tube such that they can pivot about an axis situated above the center of the bottom bracket, paired upper arm members adapted to receive the rear wheel axle at hub points located on an axis situated above their lower ends and pivotally connected to the respective lower arm members such that they can pivot about an axis near the rear ends of the lower arm members, and a shock absorber mechanism associated with the upper ends of the upper arm members and pivotally connected to an upper pivot point on the seat tube for limiting the path and the extent of movement of the upper ends of the upper arm members.

14 Claims, 3 Drawing Sheets

REAR SUSPENSION FOR BICYCLES

This is a continuation of my U.S. patent application, Ser. No. 08/303,568, filed Sep. 9, 1994, now U.S. Pat. No. 5,509,679, which is a continuation of Ser. No. 08/006,325, filed Jan. 21, 1993, now abandoned, which is a continuation-in-part of my U.S. patent application, Ser. No. 07/827,089, filed Jan. 21, 1992, now abandoned titled "Rear Suspension for Bicycles".

BACKGROUND OF THE INVENTION i. Technical Field

This invention relates to rear wheel suspensions for bicycles.

ii. Background Art

Conventionally, a bicycle is provided with a frame that is rigid or is flexible only to the extent that particular frame members are flexible. A conventional frame is made of welded generally tubular members, including a generally upright seat tube that supports the seat at its upper end and abuts the bottom bracket, in which the crank rotates, at its lower end; a generally horizontal top tube that is welded at its rear end near the top of the seat tube and at its front end to a head tube, in which the front fork, constituting the front wheel suspension, rotates for steering; a down tube that is welded at its upper front end to the head tube and at its lower rear end to the bottom bracket; and a rear wheel suspension. The seat tube, top tube, and down tube form the rigid generally triangular configuration of the main frame, with the bottom bracket carried at the lower apex. A conventional rigid rear suspension is made up of a pair of generally horizontal chain stays that are welded at their front ends to the bottom bracket and are adapted to receive the rear wheel axle near their rear ends; and a pair of seat stays that are welded at their upper ends near the top of the seat tube and are welded near the ends of the chain stay arms at their lower ends. The seat tube, chain stays, and seat stays form a rigid generally triangular configuration, with the rear wheel carried at the rear apex.

Such a conventional rigid arrangement can be suitable for road or track use, where the riding surface is generally free of irregularities, but is unsatisfactory for comfort and optimum performance off-road. As cyclists have demanded higher performance in off-road bicycles, variously referred to as "mountain bikes", "trail bikes", or "cross-country bikes", bicycle makers have recognized the desirability of providing a pivoting spring suspension for at least the rear wheel.

Pivoting "swingarm" spring suspensions have long been used for rear wheel suspension on motorcycles. In a simplest configuration, the chain stays are replaced by a pair of arms that are pivotally attached at their front ends to the frame at a pivot point near the bottom bracket. The rear ends of the swing arms, carrying the rear wheel, move upward and downward in arcs parallel to the plane described by the rear wheel and centered on the swing arm pivot axis. The range of movement of the swing arms is limited, in a simple configuration, by means such as a spring or a hydraulic shock absorber, affixed between the swing arm and a member of the rigid frame.

Motorcycle frames and swing arms are typically made very heavy, to provide sufficient strength and rigidity to prevent lateral and torsional flex. Simple swingarm suspensions have been adapted for use on bicycles in various configurations. In Kamler et al. U.S. Pat. No. 5,000,470, for example, a pair of swing arms are pivotally attached to the main frame at the bottom bracket, and the range of their upward and downward movement is limited by a pair of shock absorbers that are pivotally attached at their lower ends to pivot points on the swing arms above the rear wheel axle and at their upper ends to a pivot point on the seat tube.

When force is applied from the motor or the pedals through the chain to the rear wheel sprocket, one force component results in forward rotation of the wheel, and another force component tends to urge the wheel axle upward. As a result, in simple swingarm rear suspensions such as are described above, the swing arms pivot sharply upward when a surge of power is supplied to the rear wheel, and pivot downward again when the power is backed off. When a mountain bike, whether motor- or pedal-driven, is worked over rough terrain, this "jacking" can reduce the effective contact of the rear wheel with the riding surface and can severely compromise the rider's control over the bike.

One proposed remedy for the jacking problem in a motorcycle having a simple swingarm suspension is proposed in McGonegle U.S. Pat. No. 4,039,200. McGonegle describes positioning the swing arm pivot axis so that it intersects the tension run of the drive chain, and preferably so that it passes through the tangent point of the drive chain tension run with the power transfer sprocket or the motor drive sprocket.

Jacking further reduces performance because the upward movement of the rear wheel results in a dissipation of power that might otherwise go to forward propulsion of the bike. Such losses may be of little consequence for a motorcycle, but are intolerable to a bicyclist seeking peak performance.

Where caliper brakes are employed on a bicycle, in a simple swingarm suspension the caliper is attached to the swing arms. As a result, braking forces are translated to the swing arms, interfering the response of the suspension to the riding surface when the brakes are applied.

Lawwill U.S. Pat. Nos. 4,789,174 and 5,121,937 propose more complex pivoting rear wheel suspensions, in which a pair of swing arms is pivotally attached about or at the bottom bracket; the rear ends of the swing arms are pivotally attached to the lower end of a pair of rear hub plates, which carry the rear wheel; the upper ends of the rear hub plates are pivotally attached to the rear ends of a pair of control arms; and the front ends of the control arms are attached to a pivot point on the seat tube. In Lawwill '937 the swing arms and the control arms are dimensioned such that the pivot axis at the rear ends of the swing arms is slightly closer to the seat tube than is the pivot axis at the rear ends of the control arms; this careful maintenance of position is said to maintain the suspension in careful balance during pedaling, while at the same time permitting absorption irregularities in the riding surface. In Lawwill '174 power losses are said to be neutralized by virtue of a trapezoid formed by the location of the pivot axes together with the position of the rear wheel axle. Particularly, the point where the control arms pivot on the seat tube is substantially above the rear wheel axle, while the point where the swing arms pivot on the bottom bracket is only slightly below the rear wheel axle. This configuration of the swing arms, hub plates, and control arms is said to balance the forces applied to the rear wheel by the chain during pedaling so as to prevent energy absorbing movement of the rear suspension.

SUMMARY OF THE INVENTION iii. Disclosure of Invention

In one aspect, in general, the invention features a rear wheel suspension for a bicycle, including paired right and left lower arm members whose front ends are pivotally connected to the bicycle frame seat tube such that the lower arm members can pivot about a pivot axis situated above the center of the bottom bracket; paired right and left upper arm members whose lower ends are pivotally connected to the respective lower arm members such that the upper and lower arm members can pivot about a pivot axis near the rear ends of the lower arm members, and adapted to receive the rear wheel axle at hub points located on an axis situated above the horizon of their lower end pivot axis; and means associated with the upper ends of the upper arm members and pivotally connected to an upper pivot point on the seat tube for limiting the path of movement of, and for resiliently limiting the extent of movement of, the upper ends of the upper arm members.

The reader will appreciate that terms of relative position, such as "upper", "lower", "front", "rear", "above", "below", and the like, are used with reference to a bicycle that is standing upright with both front and rear wheels resting on a level surface. The "horizon" of a point, as that term is used here, is an imaginary line made horizontal to the point when the bicycle is standing upright with both front and rear wheels on a level surface.

In another general aspect, the invention features a bicycle having such a rear suspension.

The bicycle rear wheel suspension according to the invention provides for isolation of the pedal forces and braking forces from the suspension, resulting in reduced power dissipation and increased performance and improved comfort and safety. The suspension is structurally resistant to lateral and torsional flex, yet is lightweight and of straightforward construction, and has the traditional appearance of a bicycle. The suspension according to the invention can be applied to conventional bicycle main frames, and can accommodate conventional bicycle components such as standard chain wheels and sprockets, derailleurs, rear wheels, pedals, caliper brakes, and other standard components.

In some embodiments, the means for limiting the path and the extent of movement of the upper arm members includes a telescopic shock absorber pivotally connected to the seat tube and rigidly connected to the upper ends of the upper arm members. More preferably the means for limiting the path of movement of the upper end of the upper arm members includes a lever, most preferably an A-arm, which is pivotally connected at one end to the seat tube end at the other end to the upper end of the upper arm member; and the means for limiting the extent of movement of the upper end of the upper arm member includes a shock absorber operatively connected between the lever and the seat tube.

The shock absorber can include a spring or an elastomer or a spring-elastomer combination, or a spring-hydraulic shock absorber combination.

In preferred embodiments the pivot axis for the front ends of the lower arm members is situated at a point both above the crank axis horizon and at or below the horizon of the tangent point of a chainwheel with the tension run of the chain; where the bicycle is equipped with two or more chainwheels of different diameter, the pivot axis is preferably situated at a point at or below the horizon of the tangent point of the smaller one of two chainwheels, or a midsize one of three or more chainwheels, with the tension run of the chain.

DESCRIPTION OF PREFERRED EMBODIMENTS

As will appear in the description following, a person of ordinary skill can by inspection of the drawings ascertain a full description of the invention and of how to make and use it. Preferred embodiments are here described, beginning with a brief description of the drawings.

iv. BRIEF DESCRIPTION OF DRAWINGS

v. BEST MODE OF CARRYING OUT THE INVENTION

Figure 1:
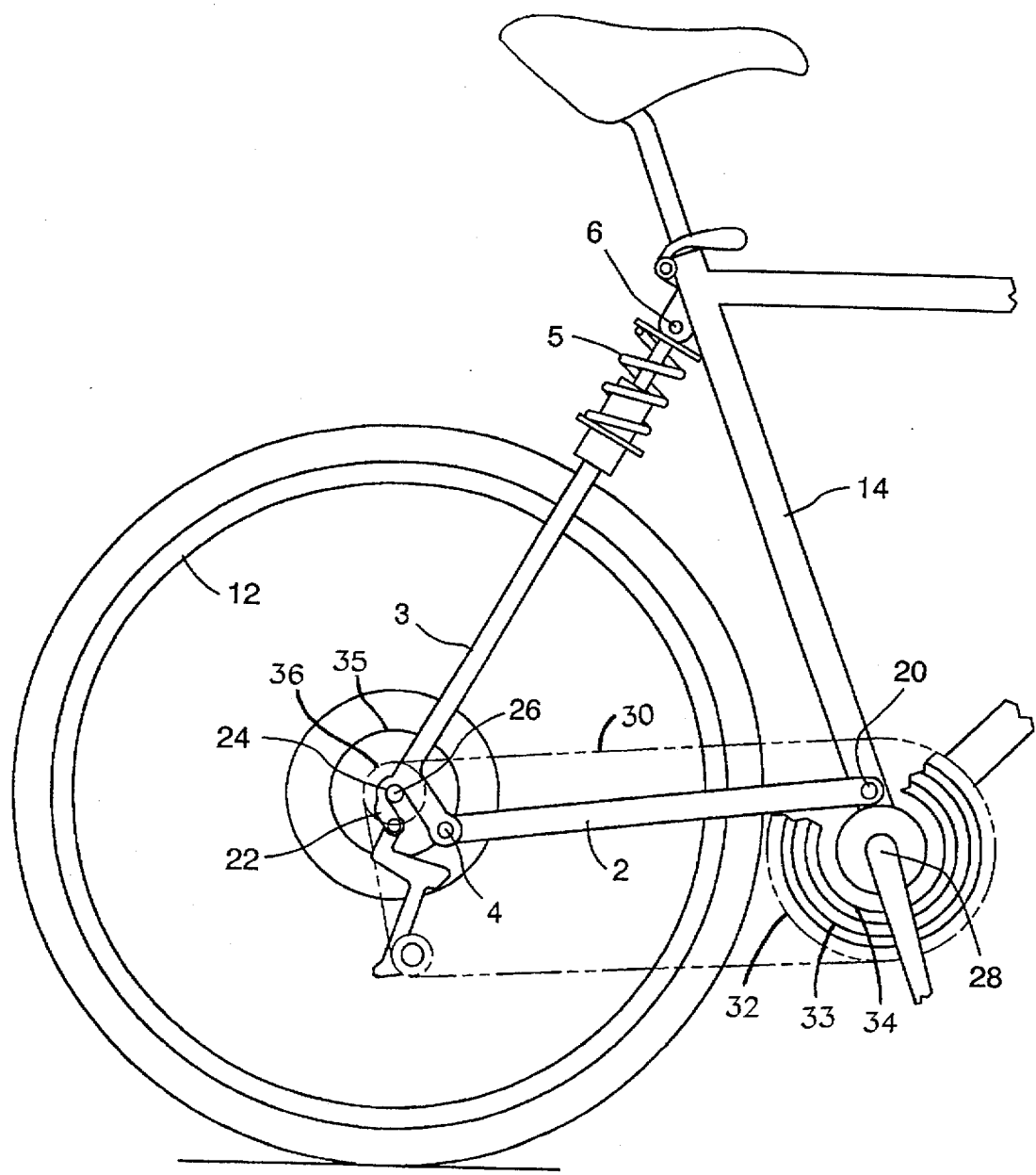
FIG. 1 is a diagram in elevational view showing an embodiment of a rear suspension according to the invention in operational relation to a bicycle, only a part of which is shown in the Figure.
Figure 2:
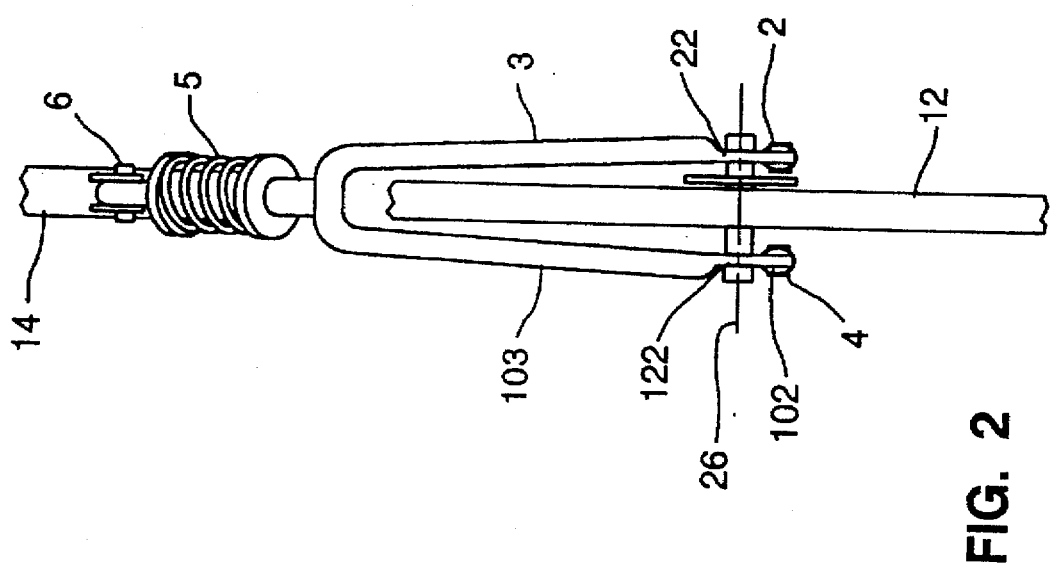
FIG. 2 is a diagram showing the embodiment of FIG. 1 in a rear view.

With reference to FIGS. 1 and 2, paired right and left lower arm members 2, 102, of which only the right one appears in FIG. 1, are pivotally attached to seat tube 14 such that they are pivotal about lower arm pivot axis 20. Paired right and left upper arm members 3, 103, of which only the right one appears in FIG. 1, are pivotally attached to respective right and left lower arm members 2, 102 such that they are pivotal about rear pivot axis 4. The upper ends of upper arm members 3, 103 are rigidly connected to one end of telescoping shock absorber 5, and the other end of shock absorber 5 is pivotally attached to seat tube 14 at upper pivot point 6. Upper arm members 3, 103 are provided with dropouts 22, 122, of which only the right one appears in FIG. 1, for receiving rear wheel 12 axle 24 at hub points located on hub axis 26, which is situated to rearward of and above the horizon of rear pivot axis 4.

Any of a variety of ways, known in the bicycle art, can be employed for establishing lower arm pivot axis 20 and pivot point 6, for pivotal attachment of the lower arm members 2, 102 and of shock absorber 5. Where the suspension according to the invention is to be retrofitted onto a conventional main frame, brackets provided with holes or pins for pivotal attachment can be clamped onto the seat tube at the appropriate points. Where the frame is being manufactured with the suspension according to the invention as original equipment, brackets can be welded directly to the seat tube in the manufacture process.

Preferably, the pivot point 6 is situated at a point opposite the point of attachment of the top tube, as that provides maximal strength. The rear end of the top tube may interfere with positioning a clamp, and where brackets are to be clamped onto the seat tube as a retrofit, the clamp may preferably be positioned immediately below (or less preferably, above) the point of attachment of the top tube.

The lower arm member pivot point can be located such that the lower arm pivot axis 20 is situated on or above the horizon of the crank axis 28; and the lower arm pivot axis 20 can be situated rearwardly from the crank axis 28. Typically, as is shown in the Figures, mountain bikes are provided with two or more chain wheels of various diameters at the crank, and a cluster of sprockets of various diameters at the rear wheel hub, providing a combination of gearing ratios over a suitably wide range. Where a single chain wheel is provided, the lower arm pivot axis is preferably located at or below the horizon of the tangent point of the tension run of the drive chain with the chainwheel, that is, at or below the horizon of the point where that chainwheel is first contacted by each link of the chain as the chain runs forward from a rear wheel sprocket to that chainwheel. Generally, where there are two or more chainwheels, the lower arm pivot axis preferably is located at or below the horizon of the smaller or smallest chainwheel, as that is the one that is capable of delivering the greatest forces through the chain to the rear wheel. Where, owing to the configuration of the bicycle or according to the kind of terrain over which it expected to be used, the smallest of three or more chainwheels would only rarely be employed, it can be preferable to index the location of the lower arm pivot axis to the next to smallest one. Thus, where three chainwheels are provided, the lower arm pivot axis 20 is preferably located at or below the horizon of the tangent point of the tension run 30 of the drive chain with the midsize one of the three chainwheels, as in the embodiment shown in the Figures, or with the smallest of the three chainwheels. Where there are two chainwheels the lower arm pivot axis 20 is preferably located at or below the horizon of the tangent point of the tension run 30 of the drive chain with the smaller of the two.

As is apparent from the Figures, the path of movement of the upper ends of upper arm members 3, 103, which are rigidly attached to the lower end of shock absorber 5, is constrained by the telescoping of the shock absorber and by the pivotal movement of the upper element of the shock absorber as the lower arm elements move upward and downward in response to riding surface irregularities or applications of surges of power to the rear sprocket through the drive chain. And the extent of the movement of the upper ends of upper arm members 3, 103 is limited by the strength of resiliency of the shock absorber.

According to the invention, as the lower arm members flex upward and downward in response to irregularities in the riding surface, or as surges of power are applied to the rear sprocket through the chain, the rear wheel axle moves not in a simple vertical arc centered at the lower arm pivot axis; rather, the rear wheel axle "floats" in a direction generally upward and slightly more rearwardly, as determined by the combination of the pivoting movements of the lower and upper arms and the shortening and lengthening of the distance between the rear pivot axis 4 and the upper pivot point 6 as the shock absorber 5 responds resiliently to the upward force component at the rear hub. As a result, the movements of the suspension are effectively isolated to some degree from the pedal forces, reducing jacking and improving the performance of the bicycle.

Figure 4:
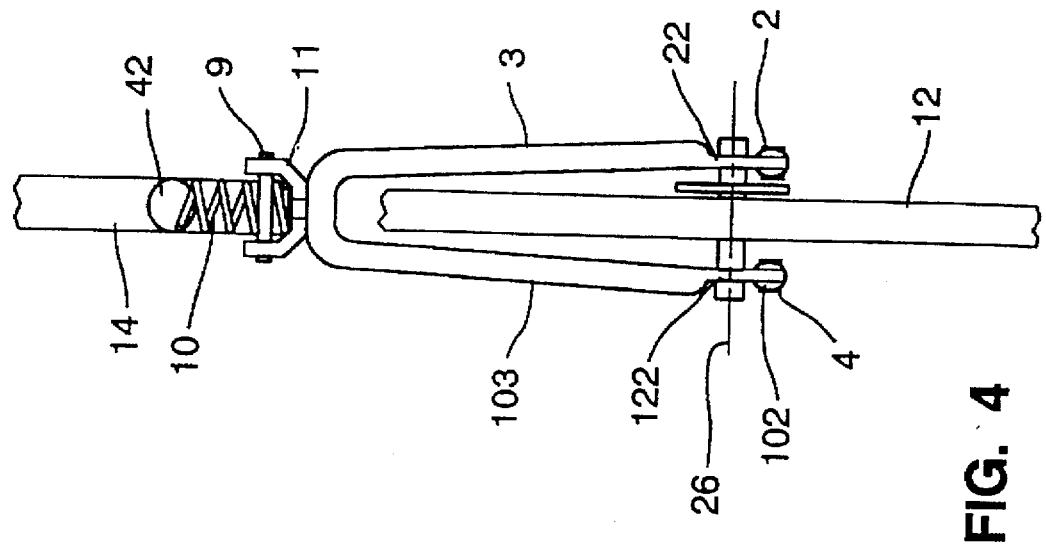
FIG. 4 is a diagram showing the embodiment of FIG. 3 in a rear view.
Figure 3:
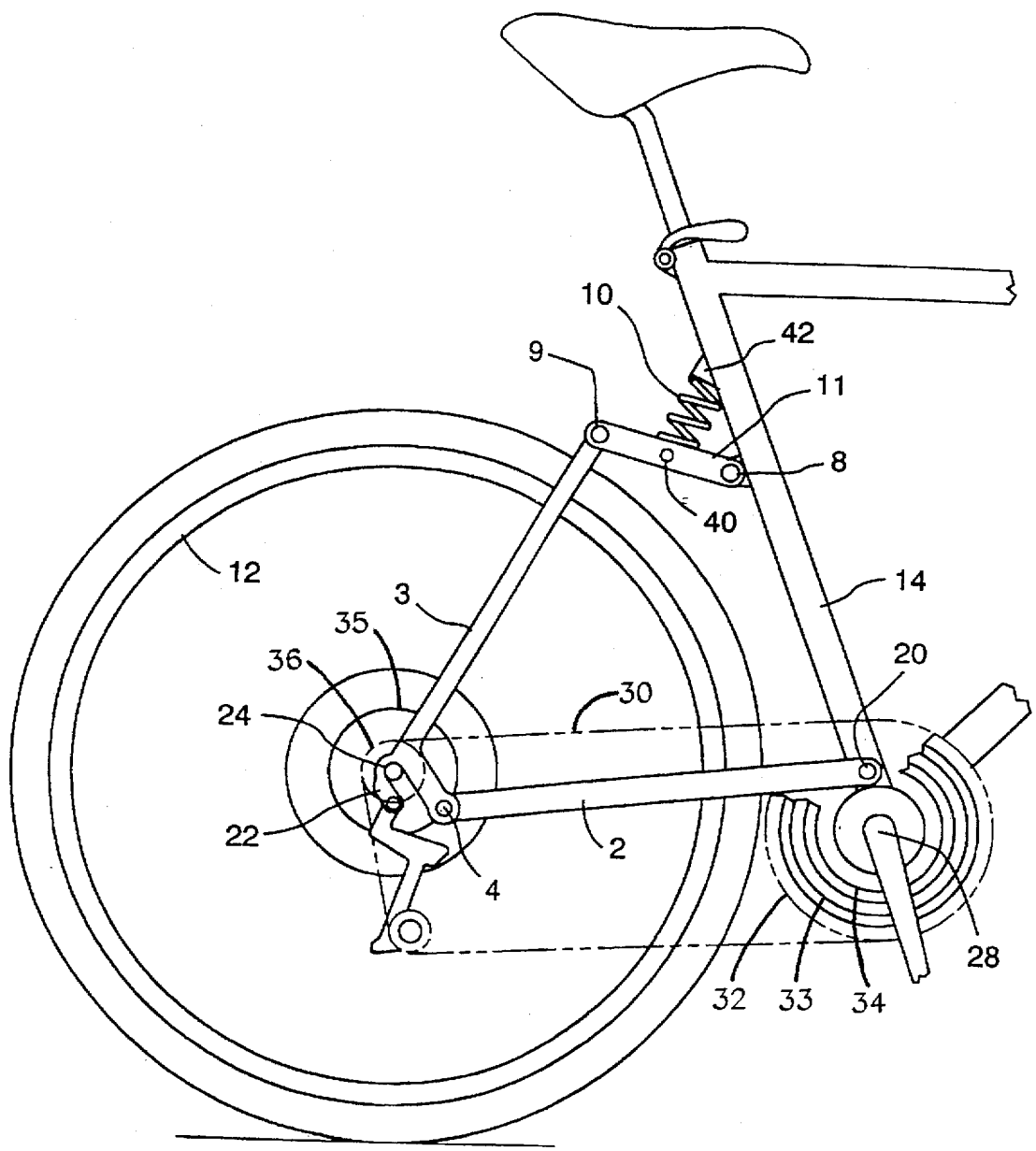
FIG. 3 is a diagram in elevational view showing an alternative embodiment of a rear suspension according to the invention in operational relation to a bicycle, only a part of which is shown in the Figure.

An alternative and still more preferred embodiment is shown in FIGS. 3 and 4, in which corresponding parts are identified by corresponding reference numerals. In this embodiment, the upper arm members 3, 103 and the lower arm members 2, 102 and the seat tube 14 are linked substantially as in the embodiment shown in FIGS. 1 and 2, and described above; and the positions of the lower arm pivot axis 20 in relation to the crank axis 28 and the chainwheel, and of the rear pivot point 4 in relation to the rear hub axis 26, are substantially as described.

In the embodiment of FIGS. 3 and 4, lever 11 is provided to pivotally link the upper ends of upper arm members 3, 103 to the main frame. The upper ends of upper arm members 3, 103 are pivotally attached to one end of lever 11 at pivot point 9, and the other end of lever 11 is pivotally attached to seat tube 14 at pivot point 8. A shock absorber 10 is operationally attached about a point 40 intermediate to the ends of the lever and a point 42 above the pivot point 8 on seat tube 14. It can be preferable to provide for pivotal attachment of shock absorber 10 to the lever at 40 or to the seat tube at 42, or at both points 40 and 42.

In this embodiment, the path of movement of the upper ends of upper arm members 3, 103 is thus constrained to an arc having its center at pivot point 8 and having a radius equal to the distance between pivot points 9 and 8. And the extent of the movement of the upper ends of upper arm members 3, 103 is limited by the resiliency of the shock absorber.

As will be appreciated, certain of the members of the suspension described above are paired so that they accommodate and embrace the rear wheel. In fact, of course, each set of paired right and left members is intended to pivot together as a unit, and corresponding members of each pair are rigidly joined to one another by methods known in the bicycle art. Unitary movement of the rigidly joined pairs about the respective pivot points ensures that the rear wheel hub axis, the crank axis, and all the pivot axes remain substantially parallel to one another throughout the range of movement under the stresses of the ride. Selected portions of the paired members can be fully united at least at a pivot point. For example, the lower arm members may be fully united toward their front ends; the upper arm members may be fully united at their upper ends; and the lever (in the embodiment shown in FIGS. 3 and 4) need not be a paired structure at all, except as may be convenient for making a stable and sturdy pivoting connection with the seat tube and the upper arm members, and as may be convenient for mounting shock absorber 5; an A-arm configuration may be preferred.

In preferred embodiments, caliper brakes are used, and the rear caliper can be mounted on one or both of upper arm members (or on a brace joining the pair near their upper ends) adjacent the rim of the rear wheel. Application of the brake has less effect on the suspension response when the caliper is mounted on the upper arm member in the configuration according to the invention than when the caliper is mounted on the swing arm, as is conventional. Also, in preferred embodiments, the rear derailleur can be mounted on an upper arm member.

vi. INDUSTRIAL APPLICABILITY

The rear suspension according to the invention provides for improved safety and performance, by effectively to some extent isolating movements of the suspension from pedal forces. As a result, the rear wheel is kept for a greater proportion of the riding time in good contact with the riding surface, even when the rider applies bursts of power to the rear wheel through the chain, and even where the riding surface is exceedingly irregular. The suspension can therefore be used with salutary effect particularly on so-called "mountain bikes" or "trail bikes" where high performance is demanded, as in competitive off-track riding. The invention provides for lightweight straightforward construction, and can be adapted to any of a variety of standard conventional main frames, so it is suitable for retrofit.

OTHER EMBODIMENTS

Other embodiments are within the following claims.
I claim:
1. A bicycle frame comprising:
a main frame including a top tube, a down tube, and a seat tube, including a bottom bracket embracing a crank axis near the main frame lower apex, said crank axis defining an axis for rotation;

a plurality of chainwheels of differing diameters mounted on said bottom bracket embracing said crank axis;

paired right and left lower arm members each having a front end and a rear end, said front ends of said lower arm members being pivotably connected to the main frame such that said lower arm members are pivotable about a lower arm pivot axis located above said crank axis;

paired right and left upper arm members each having an upper and a lower end, said lower end of each upper arm member being pivotally connected to a respective one of said lower arm members, such that said upper and lower arm members are pivotable about a rear pivot axis near said rear ends of said lower arm members, said upper arm members defining a location for receiving a rear wheel axle having an axis such that said location is spaced above a line connecting said lower arm pivot axis and said rear pivot axis;

a plurality of sprockets of differing diameters mounted on said rear wheel axle;

a resistance assembly, comprising:
 a lever unit having a first end and a second end, said lever unit pivotally connected at said first end to the main frame and pivotally connected at said second end to said upper end of said paired right and left upper arm members; and
 a shock absorber pivotably connected to said lever unit between said first end and said second end, said resistance assembly substantially continuously providing effectively all resilient resistance to movement of said upper ends of said upper arm members.

2. The bicycle frame of claim 1, wherein said lever comprises an A-arm.

3. The bicycle frame of claim 1, wherein said shock absorber comprises a spring.

4. The bicycle frame of claim 1, wherein said shock absorber comprises an elastomer.

5. The bicycle frame of claim 1, wherein said shock absorber comprises a spring and elastomer in combination.

6. The bicycle frame of claim 1, wherein said shock absorber comprises a hydraulic shock absorber.

7. The bicycle frame of claim 1, wherein said shock absorber comprises a spring and hydraulic shock absorber in combination.

8. A bicycle frame comprising:
 a main frame including a top tube, a down tube, and a seat tube, including a bottom bracket embracing a crank axis near the main frame lower apex, said crank axis defining an axis for rotation;

a plurality of chainwheels of differing diameters mounted on said bottom bracket embracing said crank axis;

paired right and left lower arm members each having a front end and a rear end, said front ends of said lower arm members being pivotably connected to the main frame such that said lower arm members are pivotable about a lower arm pivot axis located above said crank axis;

paired right and left upper arm members each having an upper and a lower end, said lower end of each upper arm member being pivotally connected to a respective one of said lower arm members, such that said upper and lower arm members are pivotable about a rear pivot axis near said rear ends of said lower arm members, said upper arm members defining a location for receiving a rear wheel axle having an axis such that said location is spaced above a line connecting said lower arm pivot axis and said rear pivot axis and is spaced above the horizon of said rear pivot axis;

a plurality of sprockets of differing diameters mounted on said rear wheel axle;

a resistance assembly, comprising:
 a lever unit having a first end and a second end, said lever unit pivotally connected at said first end to the main frame and pivotally connected at said second end to said upper end or said paired right and left upper arm members; and
 a shock absorber pivotably connected to said lever unit between said first end and said second end, said resistance assembly substantially continuously providing effectively all resilient resistance to movement of said upper ends of said upper arm members.

9. The bicycle frame of claim 8, wherein said lever comprises an A-arm.

10. The bicycle frame of claim 8, wherein said shock absorber comprises a spring.

11. The bicycle frame of claim 8, wherein said shock absorber comprises an elastomer.

12. The bicycle frame of claim 8, wherein said shock absorber comprises a spring and elastomer in combination.

13. The bicycle frame of claim 8, wherein said shock absorber comprises a hydraulic shock absorber.

14. The bicycle frame of claim 8, wherein said shock absorber comprises a spring and hydraulic shock absorber in combination.

* * * * *